United States Patent
Luckhurst et al.

Patent Number: 6,124,561
Date of Patent: Sep. 26, 2000

[54] PARALLEL DOCUMENT BUFFER AND METHOD OF BUFFERING DOCUMENTS

[75] Inventors: Graham Luckhurst, Kitchener; Bruce A. Burden; Gary E. Botzang, both of Waterloo; Vernon W. Tarbutt, Kitchener, all of Canada

[73] Assignee: NCR Corporation, Md.

[21] Appl. No.: 08/961,845

[22] Filed: Oct. 31, 1997

[51] Int. Cl.[7] ............................. B07C 5/00; G06F 17/60
[52] U.S. Cl. ........................ 209/583; 209/534; 209/900; 271/3.14; 705/45; 235/379
[58] Field of Search .................... 209/583, 656, 209/657, 900, 534; 271/3.01, 3.14; 705/39, 45; 235/379

[56] References Cited

U.S. PATENT DOCUMENTS

| | | | |
|---|---|---|---|
| 4,465,192 | 8/1984 | Ohba et al. | 209/534 |
| 4,465,925 | 8/1984 | Goi | 235/379 |
| 4,479,049 | 10/1984 | Hirose | 209/534 X |
| 4,523,330 | 6/1985 | Cain | 235/379 X |
| 4,552,350 | 11/1985 | Nagy et al. | 271/3 |
| 4,681,229 | 7/1987 | Uesaka et al. | 209/534 |
| 4,697,071 | 9/1987 | Hiraoka et al. | 235/379 |
| 4,747,492 | 5/1988 | Saito et al. | 209/534 |
| 4,883,183 | 11/1989 | Kimura et al. | 209/534 |
| 4,884,698 | 12/1989 | Tutamune et al. | 209/534 |
| 4,921,109 | 5/1990 | Hasuo et al. | 209/583 X |
| 5,143,225 | 9/1992 | Rabindran et al. | 209/900 X |
| 5,158,183 | 10/1992 | Beerman et al. | 209/900 X |
| 5,182,706 | 1/1993 | Cunningham et al. | 271/3 X |
| 5,321,238 | 6/1994 | Kamata et al. | 235/379 |
| 5,433,325 | 7/1995 | Levaro et al. | 209/584 |
| 5,478,992 | 12/1995 | Hamada et al. | 209/534 X |

FOREIGN PATENT DOCUMENTS

| | | | |
|---|---|---|---|
| 1287956 | 2/1987 | U.S.S.R. | 209/900 |
| 1623798 | 1/1991 | U.S.S.R. | 209/900 |

*Primary Examiner*—Tuan N. Nguyen
*Attorney, Agent, or Firm*—Peter H. Priest

[57] ABSTRACT

A parallel document buffer for holding a plurality of documents while recognition processing is performed on data captured from the documents. Information from each document in a document stream is captured, and passed to a recognition processor. Each document is then passed to one of a plurality of parallel buffer stages of a document buffer, and held until a specified processing time has elapsed. Upon expiration of the processing time, the document is returned to the document stream.

20 Claims, 4 Drawing Sheets

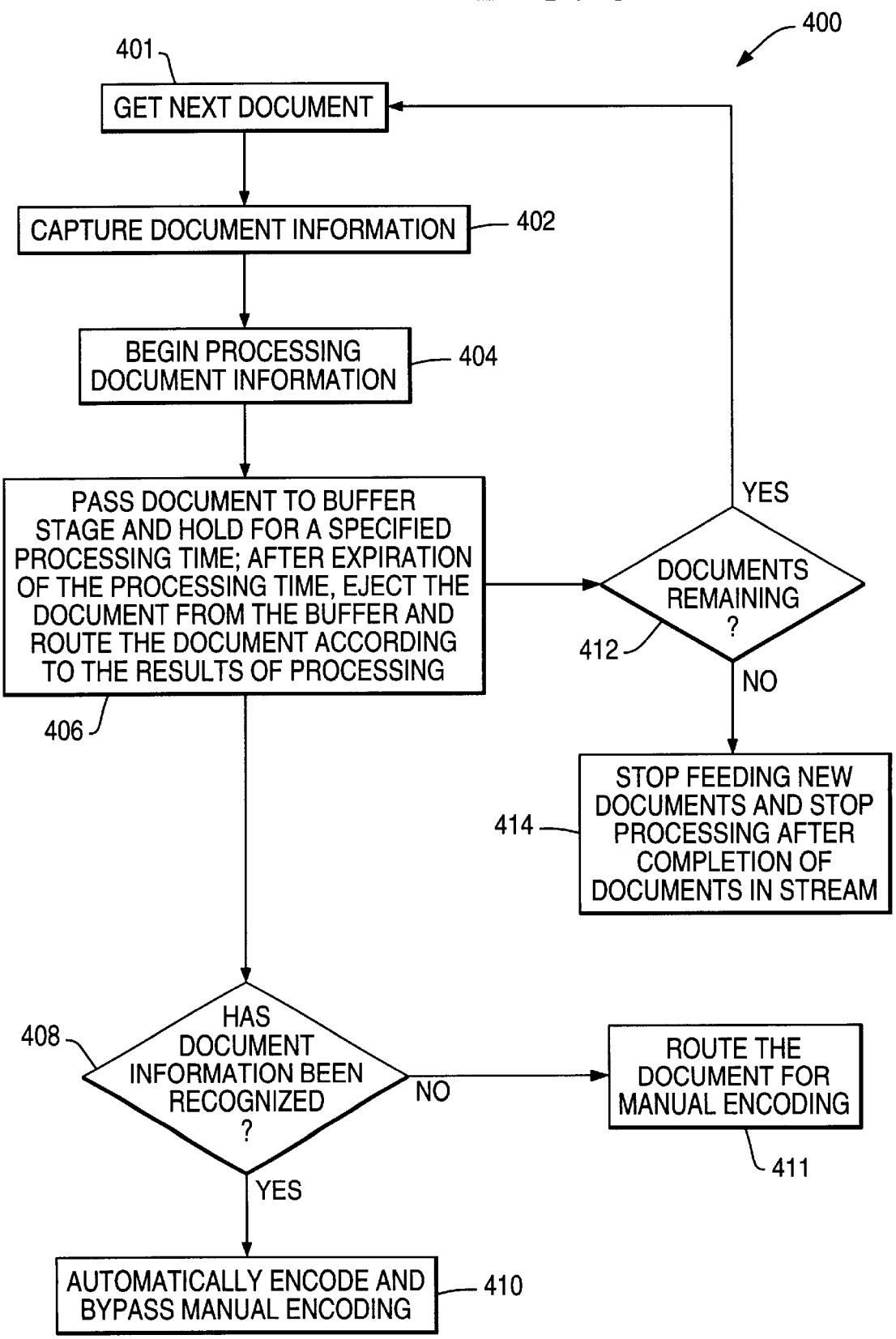

PARALLEL DOCUMENT BUFFER AND METHOD OF BUFFERING DOCUMENTS

FIELD OF THE INVENTION

The present invention relates generally to improvements in automated document processing. More particularly, the invention relates to methods and apparatus for buffering documents in order to enable the use of data recognition technology or other front end processing in document processing, in instances where the recognition or other front end process operates more slowly than the maximum document transport rate.

BACKGROUND OF THE INVENTION

The financial industry continues to rely to a very great extent on paper documents, such as checks, drafts and deposit tickets. These documents continue to increase in number, and accordingly must be processed in larger and larger numbers. Since a finite amount of time for document processing remains, the physical resources which must be devoted to processing must, in the absence of increases in efficiency, be increased.

In order to increase the efficiency of document processing, it is desirable to automate the process as much as possible. Typically, routing information is pre-imprinted onto a financial document in magnetic ink, but the amount of the document is not encoded by the time it is presented to a financial institution. Typically, this information must be manually imprinted onto the document, a process which is slower than the rest of the processing operation, and which typically requires a human operator to read the amount and then key it in. Other information typically appears on the document but it is not normally encoded onto the document in standard machine-readable form. This information includes, for example, the name of the payee, and the signature of the drawer. Automated recognition of this information can be extremely useful in combating fraud and forgery, and for providing additional checkpoints for the prevention of errors.

Automated document recognition technologies presently exist, but presently existing technologies are slower than the rest of the document processing operation. In the case of financial documents, automated document recognition can be very difficult, as documents vary widely. Documents can be of any of a number of sizes, for example. Moreover, the needed information can appear on the document in a number of forms, for example, computer-printed in any of a large number of fonts, typewritten, or handwritten in one of myriad different writing styles. Technologies now exist to analyze many of these writing and printing styles, but analysis often requires an appreciable length of time when compared with the time needed to physically move the documents.

Modern document processing equipment typically transports and processes machine-encoded documents at a very high speed, so that a typical transport system would send the document to the next stage before analysis could be completed. Automated recognition technology could be accommodated by the slowing of the transport system, but this would decrease the efficiency and the document-handling capacity of the entire system. In effect, converting a high speed document transport to a medium or low speed transport.

Thus, it would be highly advantageous to provide a system for buffering documents so that additional time could be devoted to document recognition for individual documents without adversely affecting the speed of the rest of the system. By way of example, where an additional percentage of documents can be recognized by automated recognition technology, these documents can be machine-encoded bypassing manual encoding by human operators and resulting in substantial savings in time and money. It would further be advantageous to provide a redundant document recognition system, permitting continued operation of the recognition system in the event of a partial breakdown.

SUMMARY OF THE INVENTION

In one aspect, the present invention includes a multiple-stage document buffer positioned after the document reading/imaging stage. The document buffer includes multiple stages and operates in conjunction with the recognition/sorting/data processing stages of the document processing as described in greater detail below. A processing time is associated with each stage, and represents the time period during which a document is introduced into the buffer, routed into and held in a stage, and ejected from the stage. After a document has been read, it is selectively routed into one of the parallel stages of the buffer while recognition and information processing takes place. After recognition and processing are completed, the document is sent to the next stage of the processing system. Parallel resources are preferably employed to process each document in a buffer stage, so that processing of all documents in the buffer stage can proceed simultaneously.

The parallel buffering and processing of the documents allows a greater time to be devoted to the processing of each document than would be available in the absence of such parallel buffering without slowing down the physical handling of the document by the document transport. Thus, the parallel buffering allows the speed of the transport system to be maintained, while providing sufficient time for data recognition and identification processing to occur.

Moreover, the multiple stages of the buffer provide redundancy in case one or more of the stages fails. If a stage fails, documents can be routed into the remaining stages, bypassing the failed stage. Thus, the system will continue operating at a cost of degraded performance, rather than shutting down completely.

A more complete understanding of the present invention, as well as further features and advantages of the invention, will be apparent from the following Detailed Description and the accompanying drawings.

BRIEF DESCRIPTION OF THE DRAWINGS

FIG. 4 is a flowchart illustrating a method of document buffering for recognition processing in accordance with the present invention.

DETAILED DESCRIPTION

Figure 1:
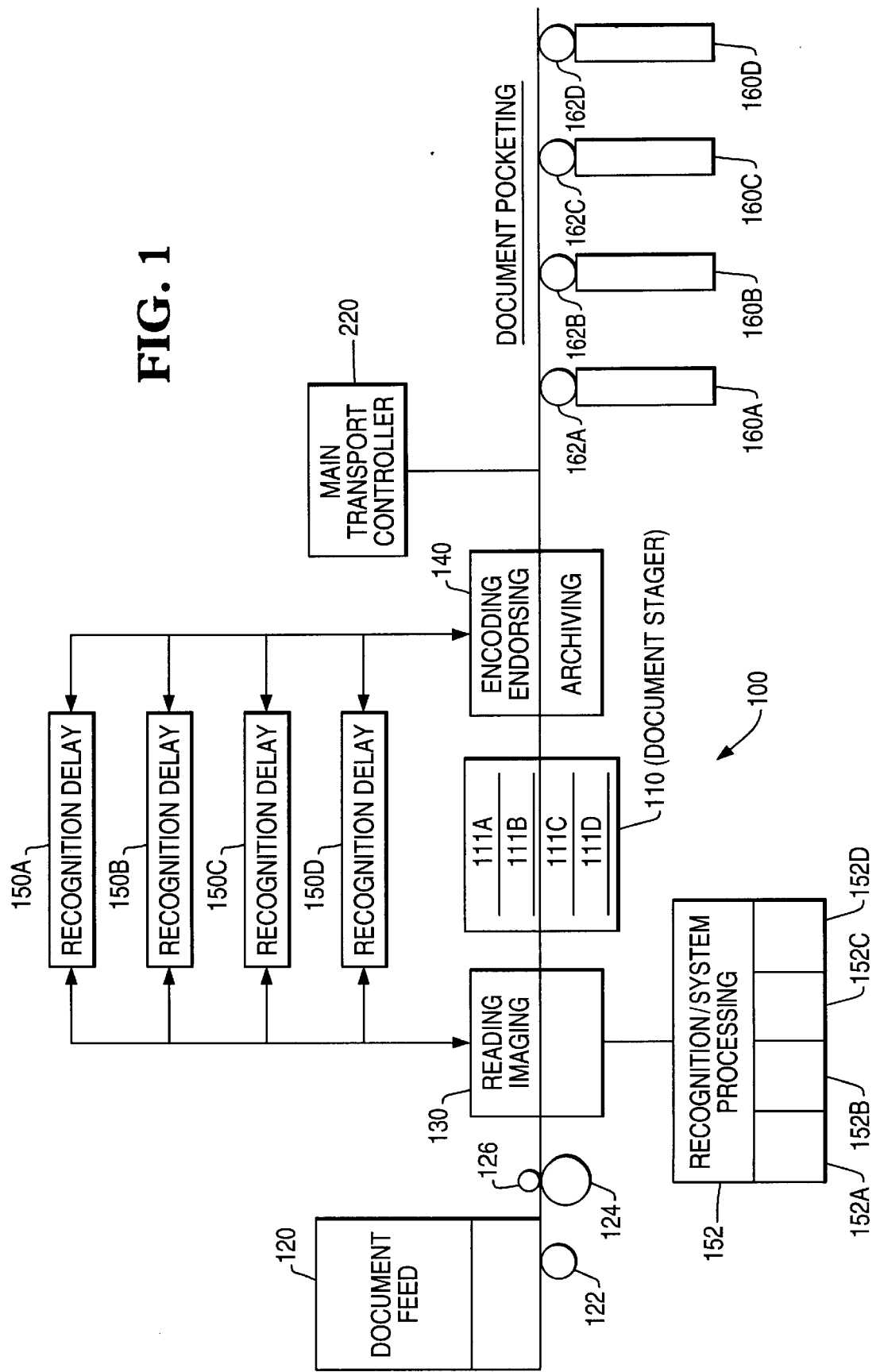
FIG. 1 illustrates a document processing system employing a document buffer according to the teachings of the present invention.

FIG. 1 shows a document processing system 100 employing a document buffer 110 according to the teachings of the present invention. Processing system 100 includes a document feeder 120, a reading/imaging stage 130, a document buffer 110, an encoding/endorsing/archiving stage 140 and document pocketing stages 160A–D. The processing system 100 also includes a main transport controller 220, which directs the flow of documents in the processing system 100. Documents are driven by rollers, shown here for purposes of illustration as rollers 122, 124, and 126, as well as rollers 162A–D. For purposes of illustration, the document buffer 110 is shown as including four buffer stages 111A–D, but it will be recognized that the document buffer 110 can be designed with as many buffer stages as desired.

Figure 2:
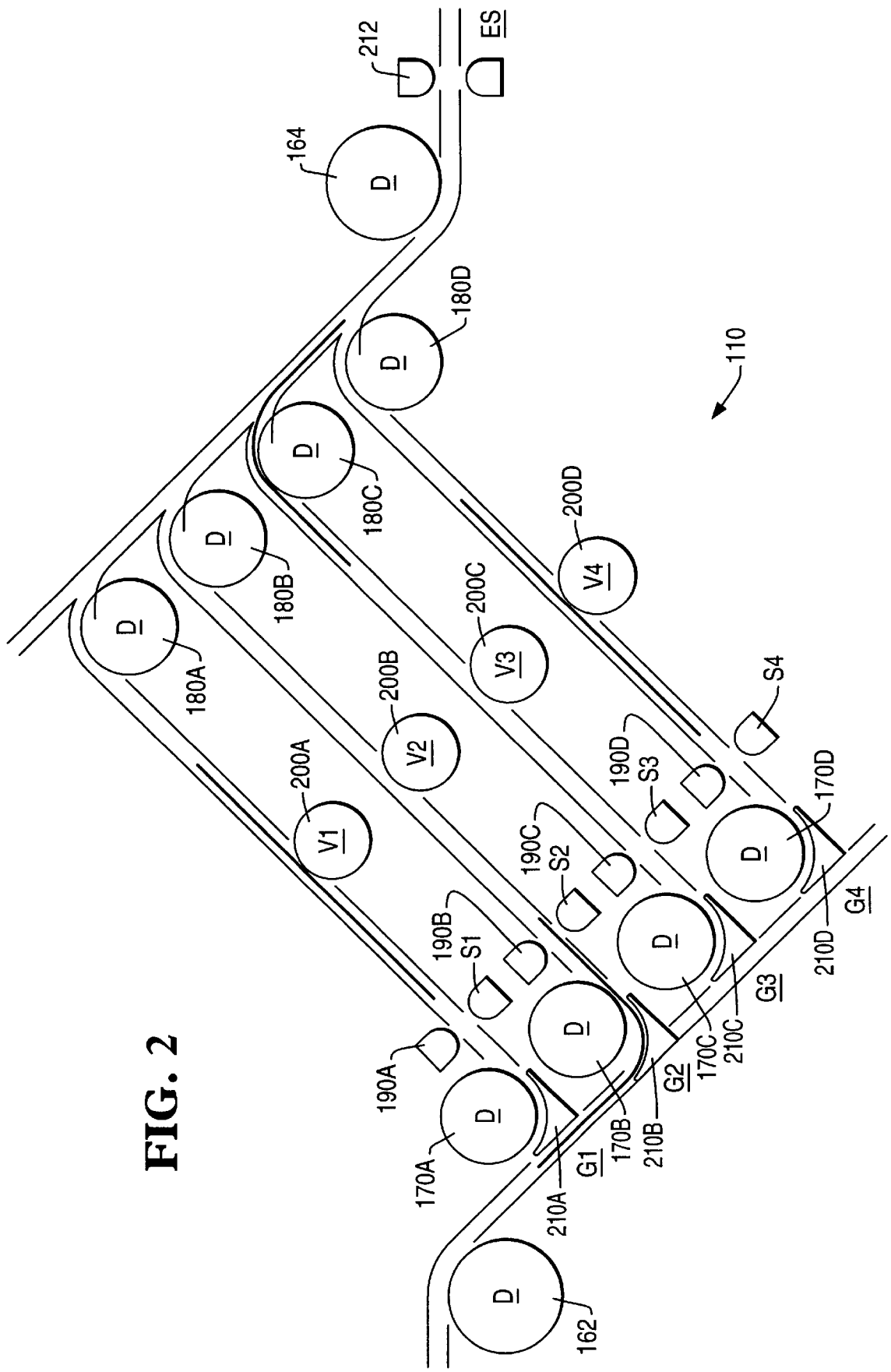
FIG. 2 illustrates further details of a document buffer according to the teaching of the present invention.

While document buffer 110 is shown in simplified form in FIG. 1, a more detailed representation of the document buffer 110 is shown in FIG. 2. One of the processing delays 150A–D is associated with each of buffer stages 111A–D, respectively. Each of the processing delays 150A–D represents the time allowed for a document in the corresponding buffer stage 111A–D to be processed. In a presently preferred embodiment, the document buffer 110 will include between two and six buffer stages. One processing delay is associated with each of the buffer stages 111A–D. Thus, the present illustration shows four processing delays 150A–D. The processing delays 150A–D are preferably set to allow each document to be held for the maximum time available for processing which can be given without interfering with the flow of the document stream. Typically, many document pocketing stages exist, but for simplicity of illustration, four document pocketing stages 160A–D are shown. Documents are directed into one of pocketing stages 160A–D, respectively, by the operation of rollers 162A–D.

At the beginning of operation of the processing system 100, a stack of documents is loaded into the document feeder 120. Documents are passed one at a time from the document feeder 120 into the reading/imaging stage 130, which captures information from the documents and transmits the information to recognition/system processing unit 152. By way of example, optical character recognition or magnetic character recognition or a combination of types of read heads may be employed to capture information. In the present embodiment, the recognition/system processing unit 152 includes four parallel recognition processors 152A–D, each of which operates independently on document information transmitted to it by the reading/imaging stage 130. The presence of parallel recognition processors 152A–D provides additional processing resources to perform recognition processing thereby permitting each document to be efficiently processed while held in the buffer 110. Documents are then passed sequentially into each of buffer stages 111A–D of buffer 110. Each document is held in its buffer stage during its associated processing delay 150A–D. Data recognition and processing proceeds on each document during the delay.

Entry of documents into and exit of documents out of the buffer 110 will be discussed in greater detail in connection with FIG. 2 below. Each document in one of the buffer stages 111A–D is ejected from the buffer 110 at the end of its processing delay 150A–D. As each document leaves buffer 110, it is passed to encoding stage 140, where it is further processed, and then routed to the appropriate one of pocketing stages 160A–D. If a document fails recognition, it may be routed to an appropriate one of pocketing stages 160A–D, where it can be held for a second pass through the processing system 100 or routed to manual coding station. If a document presents an exception, such as a fraudulent item, it may be passed to another of pocketing stages 160A–D, where it can be held for special manual handling. As will be seen in greater detail in connection with the discussion of FIG. 2 which follows, the parallel buffering of buffer 110 permits sophisticated document recognition technology to be employed, even if the time represented by the processing delay associated with the buffer stage is greater than the time which would be available in the absence of the parallel buffer 110.

FIG. 2 illustrates the document buffer 110 in greater detail. As previously mentioned, the buffer 110 includes buffer stages 111A–D, respectively. Each of the buffer stages 111A–D includes a continuously running entry and exit positive document drive roller 170A–D and 180A–D, respectively, a document entry and length detection sensor 190A–D, respectively, and a positive drive roller 200A–D, respectively, with individual start/stop control. Entry to each of the stages 111A–D is controlled by selector gates 210A–D, respectively. Each of the gates 210A–D is preferably controlled by a suitable solenoid activated mechanism. Selector gates 210A–D are appropriately activated to direct a document into the desired buffer stage. An exit sensor 212 detects the exit of a document from the buffer 110.

The drive rollers 170A–D and 180A–D are preferably positive drive rollers with a surface speed compatible with the document transport speed upstream and downstream from buffer 110. Rollers 170A–D and 180A–D are preferably positive drive rollers so that no slip of the document being driven will be allowed. Typically, idlers oppose the drive rollers where document drive is required; however, the use of idlers and other mechanical drive components are well known in the art and thus are not shown in the present specification for the sake of simplicity of illustration and to better focus on the inventive aspects of the present invention. Rollers 170A–D and 180A–D are preferably driven by a single motor 308 shown in FIG. 3 via a suitable belt or other mechanism that can be switched off when the buffer 110 is in its idle mode.

Documents are routed into the buffer 110 from the reading/imaging stage 130. In ordinary operation of processing system 100, documents flow from reading/imaging stage 130 to buffer 110 in a continuous stream, without interruption. Documents are routed sequentially into buffer stages 111A–D; first to 111A, then to 111B, then to 111C, then to 111D. As reading/imaging stage 130 routes each document to a buffer stage, reading/imaging stage 130 also transmits the document information to the data recognition processor 152A–D associated with the buffer stage 111A–D. As each of the data recognition processors 152A–D receives the information, it begins to process the information. For example, as reading/imaging stage 130 routes a document to buffer stage 111A, document information read from that document is transmitted to the data recognition processor 152A. As data recognition processor 152A is processing the document information, another document is routed to the buffer stage 111B and its associated information is transmitted to the data recognition processor 152B. Documents similarly enter buffer stages 111C and 111D, and information is transmitted to data recognition processors 152C and 152D, respectively.

As a document enters buffer stage 111D, processing is being completed by the data recognition processor 152A, and the document in buffer stage 111A is ejected. A new document enters buffer stage 111A. At this time, processing is completed by the data recognition processor 152B, and the document in buffer stage 111B is ejected. This continues in sequence until the document stream finally ends.

In the illustration of FIG. 2, a view of buffer 110 is captured at a point in which processing of the document stream is well underway. FIG. 2 shows documents stopped in buffer stages 111A and 111D, respectively. Processing has begun and is continuing on the documents in buffer stages 111A and 111D. At the same time, processing has just been completed, or alternatively, the time allotted for processing has elapsed, for the document in buffer stage 111C, and that document is being ejected into the document stream. Processing has just begun on the document entering buffer stage 111B, and that document is entering buffer stage 111B. Momentarily, after the document entering buffer stage 111B stops and is held, a new document will be admitted to buffer stage 111C, and the document in buffer stage 111D will be ejected.

Documents are introduced into and ejected from the buffer stages 111A–D by the drive rollers 200A–D, respectively. Gates 210A–D are opened and closed, as appropriate, to admit a document into the appropriate buffer stages 111A–D. Appropriate ones of the rollers 200A–D are activated in order to admit and eject documents into and out of the appropriate buffer stages 111A–D. As previously noted, the drive rollers 170A–D and 180A–D run continuously. As a document enters, for example, buffer stage 111A, roller 200A is activated. Roller 200A catches the document and positions the document appropriately within the buffer stage 111A. As the trailing edge of the document passes sensor 190A, roller 200A is stopped. Rollers 200A–D must be properly braked, so that they are able to stop documents before the documents are delivered to the rollers 180A–D.

Figure 3:
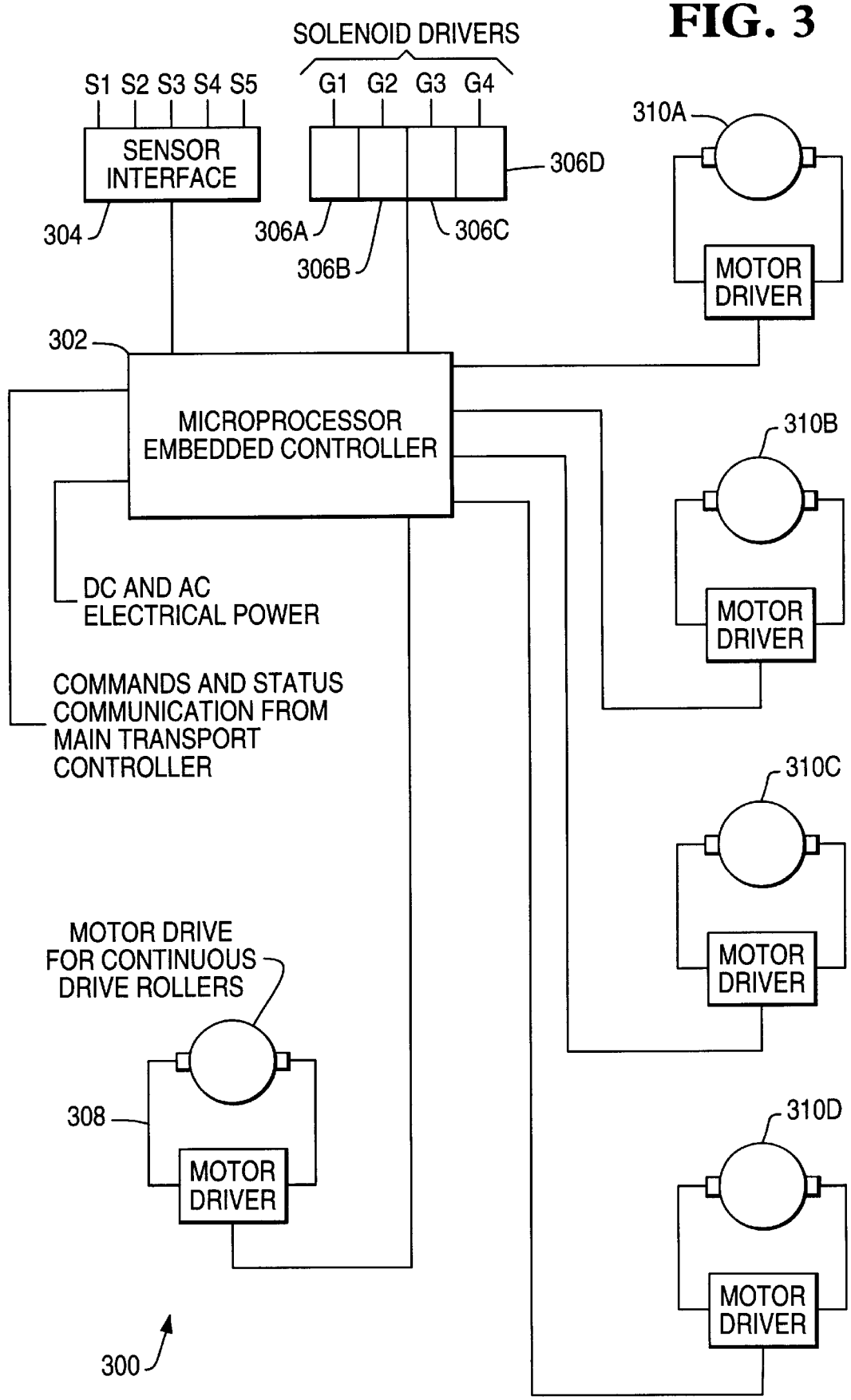
FIG. 3 is a block diagram of suitable control hardware for a document buffer according to the present invention.

The rollers 200A–D are preferably independently driven by step or servo motors 310A–D, respectively, as shown in FIG. 3. Suitable speed control is provided to rapidly ramp up rotational speed from stationary to a speed that will generate a surface speed equal to the surface speed of rollers 170A–D and 180A–D. The speed control also provides rapid braking from full speed to stationary.

The use of the document buffer 110 according to the present invention provides numerous advantages. Individual documents can be given greatly increased time for processing, without delaying the document stream as a whole, and allowing the greater portion of the document stream to run continuously at a high speed. The only delaying of documents is that done by the document buffer 110. No other portions of the document stream need stop or pause. This greatly reduces the number of times the transport system needs to start and stop, thus greatly increasing reliability of the transport system components.

Moreover, the holding and staging of documents permits the latest recognition technologies to be used, increasing the amount of information that can be gathered and processed, even if these technologies require additional time to operate. The number of buffer stages can be raised to match the recognition delay to the maximum transport speed. The additional processing time provided by buffering documents also permits more complex algorithms to be used, or more information to be gathered.

All sensors may be used to detect document jams immediately upstream from each sensor. To facilitate easy removal of documents from the buffer 110, the top of buffer 110 is preferably left open.

If a mode of operation of document processing system 100 does not require the parallel document buffer function, documents can pass continuously through any of the document buffers 111A–D, or a predetermined one of the document buffers, with the appropriate ones of the drive rollers 200A–D running at full speed without stopping.

FIG. 3 is a block diagram of a control system 300 which may be suitably employed to control the document buffer 110. Control system 300 includes a microprocessor embedded controller 302 with suitable software to carry out the desired functions. As such, the control system 300 may be readily adapted as pertinent technology evolves. The controller 302 receives DC and AC electrical power, and receives commands and status information from the main transport controller 220. Controller 302 receives inputs from a sensor interface 304, which receives and processes inputs S1–S5 from each of the sensors 190A–D and 212. Controller 302 issues commands G1–G4 to solenoid drivers 306A–D, respectively. Each of the solenoid drivers 306 A–D controls a corresponding one of the gates 210A–D. The controller 302 also controls the continuous drive motor 308, which drives the rollers 170A–D and 180A–D. Controller 302 also controls variable drive motors 310A–D. Each of variable drive motors 310A–D controls a corresponding one of the rollers 200A–D.

FIG. 4 is a flowchart illustrating a method of document buffering 400 according to the present invention. At step 401, the next document is retrieved and control is passed to step 402. At step 402, document information is captured and control is passed to step 404. In step 404, processing is begun on the document information and control is passed to step 406. At step 406, the document is passed to a buffer stage and held for a specified processing time. After the processing time expires, the document is ejected from the buffer and routed according to the results of the processing. Where the document information, such as the courtesy amount, has been recognized in step 408, the document is automatically encoded in step 410 and bypasses the manual coding stations. Where the document information has not been recognized in step 408, the document is routed for manual encoding in step 411. Immediately after a document is passed to the buffer, control is passed to step 412 and a check is made to determine if any documents remain to be processed. If documents remain to be processed, control is transferred back to step 401 and the next document is retrieved. If no more documents remain, control is transferred to step 414 and document processing is stopped after completion of processing for the documents currently in the document stream.

While the present invention is disclosed in the context of a presently preferred embodiment, it will be recognized that a wide variety of implementations may be employed by persons of ordinary skill in the art consistent with the above discussion and the claims which follow below.

What is claimed is:

1. A document buffer for receiving each of a plurality of documents from a document stream and holding each of the plurality of documents for a processing time during which automated recognition and processing is performed by a document processing system at a predetermined rate on information captured from each of the plurality of documents, comprising:

a predetermined number of parallel document buffer stages, each buffer stage being able to receive one of the plurality of documents, each buffer stage being operative to hold the document for the processing time associated with each buffer stage, each buffer stage being further operative to eject the document after the processing time has elapsed, the buffer being operative to return each document to the document stream after ejection of each document from the each of the predetermined number of buffer stages;

a drive mechanism for driving the documents into and out of the buffer and into and out of the buffer stages; and a control mechanism for controlling routing of the documents into and out of the buffer stages, the control mechanism directing entry of each document into a selected one of the buffer stages, the control mechanism further controlling the timing of entry and exit of each document into the selected one of the buffer stages;

wherein the predetermined number of buffer stages is selected based on the processing time to allow the processing system to operate at the predetermined rate.

2. The buffer of claim 1 further comprising at least one continuous drive roller at each of an entry and exit of the buffer to transport the documents into and out of the buffer.

3. The buffer of claim 2 further comprising at least one continuous drive roller at each of the entry and exit of each buffer stage to transport the documents into and out of the buffer stage.

4. The buffer of claim 3 further comprising at least one variable drive roller within each buffer stage, the variable drive roller stopping the document after entry of the document into the buffer stage, holding the document during the processing time, and delivering the document to the continuous drive roller at the exit of the buffer stage after the expiration of the processing time.

5. The buffer of claim 4 further comprising at least one gate at the entry of each buffer stage, each gate being opened or closed so as to direct each document into a selected buffer stage.

6. The buffer of claim 5 further comprising a buffer stage sensor at the entrance at each buffer stage, the sensor being operative to detect the entry of the document into the buffer stage.

7. The buffer of claim 6 further comprising an exit sensor at the exit of the buffer, the exit sensor being operative to detect the exit of the document from the buffer.

8. The buffer of claim 7 wherein the gates are operated by a solenoid activated mechanism.

9. The buffer of claim 3 wherein the continuous drive rollers are all driven by a single motor.

10. The buffer of claim 4 wherein each of the variable drive rollers has an operative surface speed equal to the surface speed of the continuous drive rollers.

11. A method of parallel processing a plurality of documents in a document stream at a predetermined rate, comprising:

capturing information from at least a portion of each of the documents;

processing the captured information by a recognition system during a designated processing time, the processing proceeding in parallel for each of the documents;

during processing of the captured information, holding each of the documents associated with the captured information during the designated processing time in a buffer stage of a predetermined number parallel multiple buffer stages, each document being returned to the document stream upon an expiration of the designated processing time, wherein the predetermined number of buffer stages is selected based on the designated processing time to allow the document stream to operate at the predetermined rate; and routing each of the documents based on the result of the processing for the document.

12. The method of claim 11 further comprising the step of routing a document for reprocessing if processing is not accomplished successfully during the designated processing time.

13. The method of claim 12 further comprising the step of routing a document for special handling if the document meets specified criteria.

14. The method of claim 11 wherein said processing further comprises attempting to perform automatic recognition of the captured information.

15. The method of claim 14 further comprising the step of automatically encoding information automatically recognized on a document.

16. The method of claim 15 further comprising the step of routing the document which has been automatically encoded so as to bypass a manual encoding station.

17. The method of claim 14 further comprising the step of routing a document to a manual encoding station where the attempt to perform automatic recognition is unsuccessful.

18. The method of claim 11 further comprising the step of transporting the plurality of documents faster than the processing of the captured information could be completed without holding the documents in the parallel multistage buffer.

19. The method of claim 18 wherein the number of stages in said parallel multistage buffer is selected to match the processing speed to the transporting speed.

20. A document system for processing at a predetermined rate each of a plurality of documents from a document stream and holding each of the plurality of documents for a processing time during which processing is performed on information captured from each of the plurality of documents, comprising:

a document imaging device for capturing information from each of the plurality of documents in the document stream;

a recognition system for receiving and processing the information acquired from each of the plurality of documents; and a document buffer comprising a predetermined number of parallel document buffer stages, each buffer stage being able to receive one of the plurality of documents, each buffer stage being operative to hold the document for a processing time associated with each buffer stage, each buffer stage being further operative to eject the document after the processing time has elapsed, the buffer being operative to return each document to the document stream after ejection of each document from the each of the predetermined number buffer stages;

a drive mechanism for driving the documents into and out of the buffer and into and out of the buffer stages; and a control mechanism for controlling routing of the documents into and out of the buffer stages, the control mechanism directing entry of each document into a selected one of the buffer stages, the control mechanism further controlling the timing of entry and exit of each document into the selected one of the buffer stages;

wherein the recognition system performs data recognition and processing on each of the plurality of documents during the processing time associated with each of the buffer stages;

wherein the predetermined number of buffer stages is selected based on the processing delay to allow the document system to operate at the predetermined rate.

* * * * *